Dec. 4, 1923.

W. H. HARDEN 1,476,608

COMBINED REFRIGERATOR AND CHEESE CUTTER

Filed June 12, 1922    2 Sheets-Sheet 1

W. H. Harden
INVENTOR
BY Victor J. Evans
ATTORNEY

WITNESS:

Dec. 4, 1923.  1,476,608
W. H. HARDEN
COMBINED REFRIGERATOR AND CHEESE CUTTER
Filed June 12, 1922   2 Sheets-Sheet 2
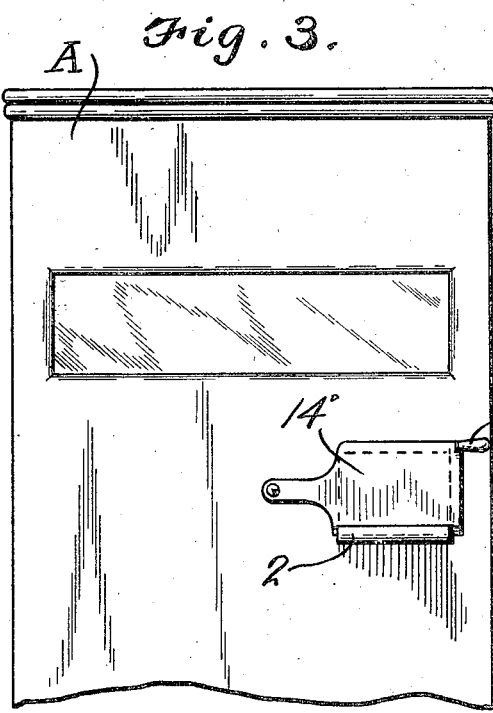
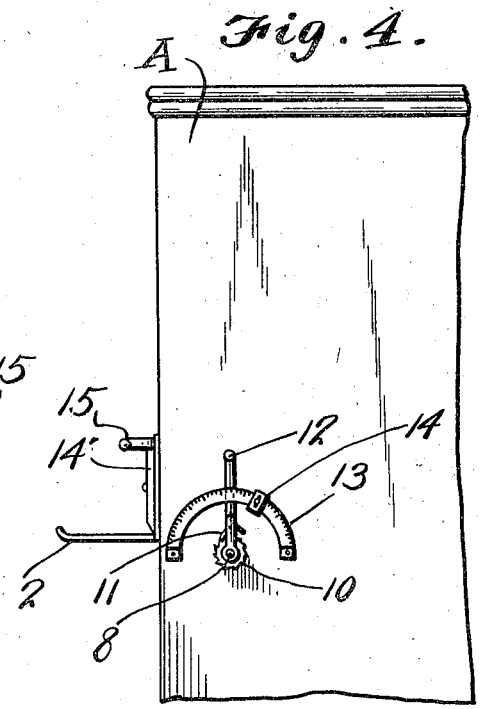
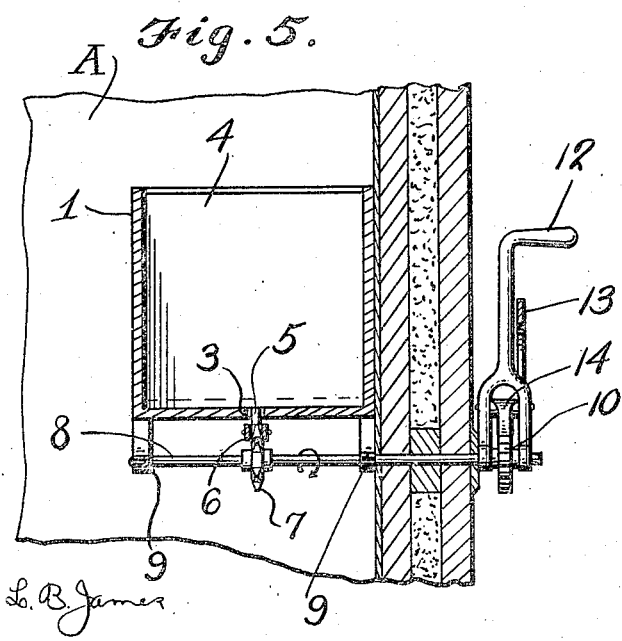
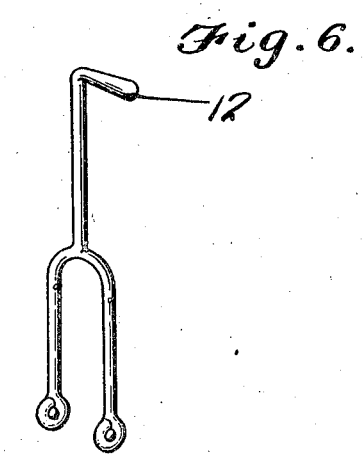
W. H. Harden
INVENTOR
BY Victor J. Evans
ATTORNEY Patented Dec. 4, 1923.

1,476,608

UNITED STATES PATENT OFFICE.

WILLIAM H. HARDEN, OF MANTEE, MISSISSIPPI.

COMBINED REFRIGERATOR AND CHEESE CUTTER.

Application filed June 12, 1922. Serial No. 567,873.

*To all whom it may concern:*

Be it known that I, WILLIAM H. HARDEN, a citizen of the United States, residing at Mantee, in the county of Webster and State of Mississippi, have invented new and useful Improvements in Combined Refrigerators and Cheese Cutters, of which the following is a specification.

This invention relates to a combined container and cutter for cheese and the like, the general object of the invention being to provide a casing for the cheese which may be placed in a refrigerator and which is provided with means for forcing a part of the cheese therefrom and with a knife for cutting a slice from the cake.

Another object of the invention is to provide means for forcing the cheese from the casing which are operated by a chain and a handle which rotates a shaft having a sprocket over which the chain passes.

A further object of the invention is to provide means for cutting the slices in certain thicknesses, thus enabling the operator to cut slices which will be all of the same size, when desired.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 3 is an elevation showing part of a refrigerator with the invention applied thereto.

Figure 4 is a view taken at right angles to Figure 3.

Figure 5 is a detail view showing the feeding mechanism.

Figure 6 is a view of the operating lever.

Figure 1:
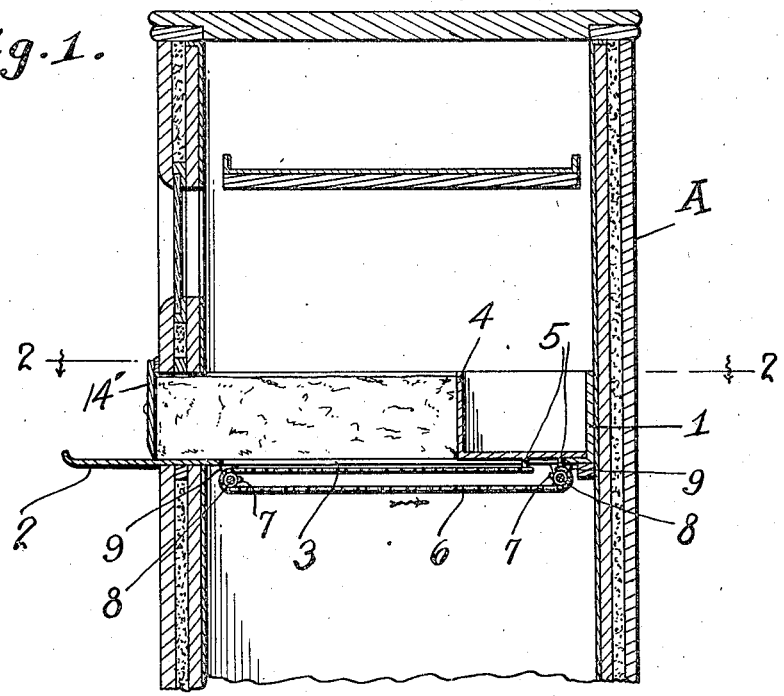
Figure 1 is a sectional view showing the invention placed in a refrigerator.
Figure 2:
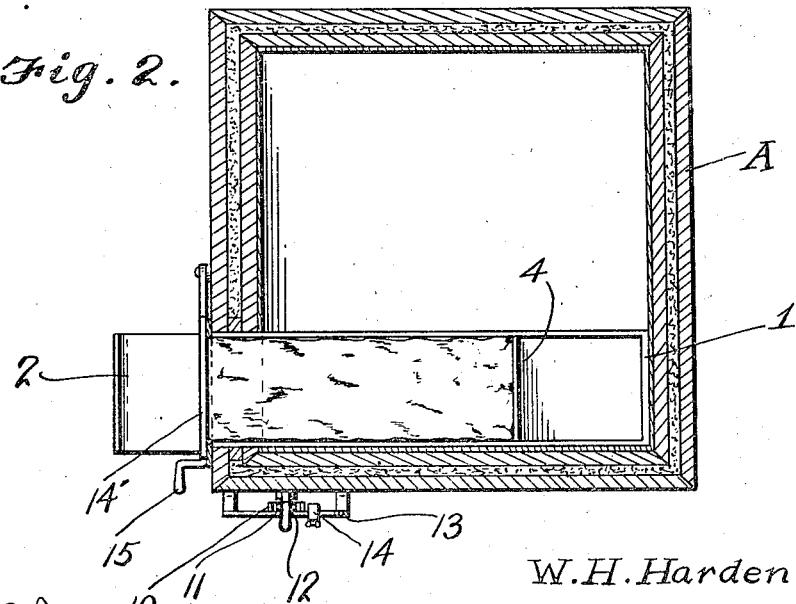
Figure 2 is a section on line 2—2 of Figure 1.

In these views, 1 indicates a casing, which has its front end open and its bottom projecting at said front end to form a shelf, as shown at 2. This bottom has a slot 3 therein. A block 4 is placed is the casing and projections 5 thereon extend through the slot. These projections are secured to the ends of a chain 6 which passes over sprockets 7 which are secured to shafts 8. These shafts are carried by bearings 9 on the bottom of the casing. The front shaft has a ratchet 10 thereon which is engaged by a pawl 11 on a handle 12, the forked end of which is pivotally connected with the shaft and straddles the ratchet. Thus when the handle is moved in one direction, the pawl engaging the ratchet, will cause the shaft to move with the handle, but when the handle is moved in the other direction, the pawl will simply slip over the ratchet and thus not move the shaft. This movement of the parts will cause the block to push the cake of cheese from the casing upon the shelf, and in order to indicate the amount of the cake which has been pushed out I provide a scale 13, which is provided with an adjustable stop 14 thereon for limiting the movement of the handle. Thus a certain amount of the cake may be forced from the casing. In order to cut slices from the cake, I provide a knife 14 which operates over the front of the casing and will cut that part of the cake which projects from the casing and is resting on the shelf. This knife is provided with a handle 15 by which it may be actuated. The casing is mainly designed to be placed in a refrigerator A, as shown in Figure 1, but it may be placed on tables and the like.

This device will keep the cheese or other matter placed therein in good condition and free from dirt and dust and parts can be cut from the cake without handling the same and without removing the device from the refrigerator.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having thus described my invention what I claim as new is:—

An attachment for a refrigerator comprising a casing arranged therein and extending through one wall thereof, a shelf integrally formed with the bottom of the casing and extending beyond the walls of the refrigerator, a handled knife pivotally secured to the outer wall of the refrigerator and normally resting upon the shelf to provide a front wall of the casing, an angle block arranged in the casing for slidable movement and being adapted to engage a piece of material for moving the latter toward the knife so it may be cut, a pair of spaced shafts journalled in the refrigerator adjacent each end of the lower end of the casing, a sprocket carried by each shaft, a chain trained over the sprocket, spaced projections depending from the angle block and carrying the ends of the chain respectively, means for revolving one of said shafts to impart a forward motion to the angle block and means for limiting the revolving means at any desired point.

In testimony whereof I affix my signature.

WILLIAM H. HARDEN.